April 12, 1955   L. L. GERWIG   2,705,937
HYDRAULICALLY-OPERATED THERMOMETER STOP FOR FREEZEMETERS
Filed Aug. 24, 1953
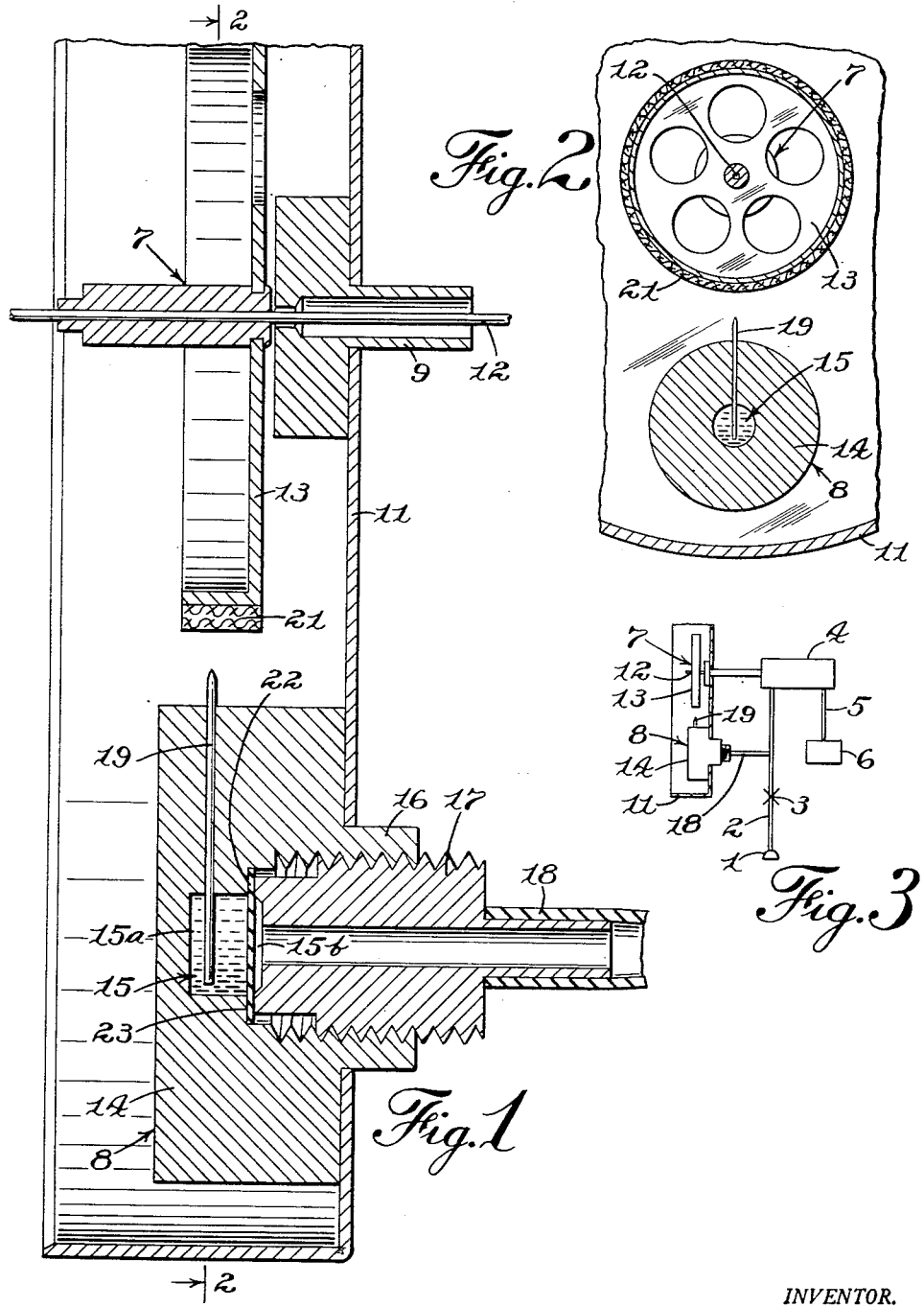
WITNESS:
Esther M. Stockton
INVENTOR.
Larry L. Gerwig
BY
Clinton L. Janes
ATTORNEY

United States Patent Office 2,705,937
Patented Apr. 12, 1955

2,705,937

HYDRAULICALLY-OPERATED THERMOMETER STOP FOR FREEZEMETERS

Larry L. Gerwig, Elmira Heights, N. Y., assignor to Bendix Aviation Corporation, a corporation of Delaware Application August 24, 1953, Serial No. 376,061

3 Claims. (Cl. 116—129)

The present invention relates to a hydraulically-operated thermometer stop for freezemeters.

In apparatus for determining the freezing point of arctic coolants for internal combustion engines such as disclosed, for instance, in the patent to Dickey et al., 2,635,457, issued April 21, 1953, it is desirable that the thermometer needle be arrested promptly and held firmly at the point where a frozen sample begins to flow. Various automatic arresting means have been devised to accomplish this result, but there has been room for improvement in the celerity and uniformity of the action.

It is an object of the present invention to provide a novel hydraulic arresting means for a freezemeter thermometer which responds effectively to a very small displacement of actuating liquid.

It is another object to provide such a device in which the arresting action is definite and positive, free from slippage or lost motion.

Further objects and advantages will be apparent from the following description taken in connection with the accompanying drawing in which:

Fig. 1 is a substantially mid-sectional view of a preferred embodiment of the invention;

Fig. 2 is a section on a reduced scale taken substantially on the line 2—2 of Fig. 1; and Fig. 3 is a semi-diagrammatic illustration of the hydraulic system of a freezemeter incorporating applicant's novel arresting means.

In Fig. 3 of the drawing there is illustrated the circulatory system of a freezemeter as shown and described in the patent to Dickey et al., above cited, including the intake fitting 1 connected by a conduit 2, containing a valve 3, to a heat exchanger 4. The heat exchanger is connected by a tube 5 to a pump 6 which is operable to draw a sample of the liquid to be tested into and through the heat exchanger 4, and to place pressure on the sample to eject it from the heat exchanger after the sample therein has been frozen.

A thermometer indicated generally by numeral 7 has its heat-sensitive element located within the heat exchanger 4 in order to indicate its internal temperature, and means 8 are provided for arresting the indicating needle of the thermometer at the thawing point of the sample in the heat exchanger.

In Fig. 1 of the drawing, applicant's novel arresting means is shown in detail. As there illustrated, the hollow stem 9 of thermometer 7 is fixedly mounted in a casing 11, and the needle staff 12 of the thermometer is rotatably mounted in the stem and has a wheel 13 non-rotatably mounted on the needle staff. A member 14 having a pressure chamber 15 formed therein is rigidly mounted in the casing 11 in any suitable manner, and has a socket 16 communicating with the chamber 15 which is threaded for the reception of a nipple 17 connected by a tube 18 to the conduit 2. A pointed cylindrical needle 19 is slidably mounted in the wall of the pressure chamber 15 in position for movement into and out of engagement with the periphery of the wheel 13 on the thermometer needle staff 12.

In order to promptly arrest and firmly hold the wheel 13 against rotation when the needle 19 is pressed against its periphery, a ring 21 of material easily penetrable by the needle is fixedly mounted on the periphery of the wheel. It has been found that the most suitable material for this purpose is a good grade of commercial felt since this material allows the point of the needle to enter easily without lateral movement or slippage, and thereafter firmly opposes any rotary movement of the wheel 13 until the needle is withdrawn. The felt annulus is preferably cemented to the entire periphery of the wheel to prevent any relative lateral movement.

In operation, when it is desired to determine the freezing point of a liquid, a sample is drawn in through conduit 2 and heat exchanger 4 by manipulation of the pump 6. The sample in the heat exchanger 4 is then frozen by passage of a freezing medium such as expanded carbon dioxide gas and snow through the envelope of the heat exchanger as set forth in greater detail in the Dickey et al., patent above cited. After the sample is frozen, the pump 6 is released so as to place a static pressure on the sample in the heat exchanger, and the valve 3 is closed.

The heat exchanger 4 is then permitted to gradually absorb heat from the surrounding atmosphere, and when the sample therein begins to thaw, the pressure from the pump 6 is transmitted through the sample to the conduit 2. Since the valve 3 is closed, this pressure is transmitted through the tube 18 to the pressure chamber 15 which causes the needle 19 to be projected into contact with the felt surface 21 of the wheel 13, thus effectively immobilizing the thermometer staff 12 and thereby recording the thawing temperature of the sample. After the reading has been taken, the valve 3 is opened to permit the sample to be flushed out. The suction created by the pump 6 in drawing in a fresh sample causes the needle 19 to be withdrawn to its idle position preparatory to a new determination.

In some instances it has been found desirable to partition off the portion of the pressure chamber 15 containing the needle 19 in order to prevent direct access of the coolant liquid to that portion of the chamber. This is accomplished by the use of a flexible diaphragm 22 clamped by the nipple 17 against the wall 23 of the pressure chamber. By this means the pressure chamber 15 is divided into two cells 15a and 15b, the cell 15a which contains the needle 19 being filled with any suitable non-compressible liquid.

Although but one form of the invention has been shown and described in detail, it will be understood that other forms are possible and changes may be made in design and arrangement of parts without departing from the spirit of the invention.

I claim:

1. In combination with a rotary pointer staff, means for immobilizing said pointer staff including a wheel fixedly mounted on the staff, a peripheral coating on the wheel of felt-like material, a pressure chamber adjacent the rim of said wheel, a cylindrical needle mounted with one end within the chamber and with a pointed end slidingly projecting through the wall of the chamber for sliding movement into and out of engagement with the coating of the wheel, and means for creating hydraulic pressure in the chamber to project the point of the needle into said coating.

2. The combination set forth in claim 1 in which the needle is mounted and guided in a path radial to said wheel.

3. The combination set forth in claim 1 including further an elastic partition in the pressure chamber dividing it into two cells, the needle being mounted in one cell which is filled with a liquid, and the hydraulic pressure being applied to the other cell.

References Cited in the file of this patent

UNITED STATES PATENTS

| | | |
|---|---|---|
| 1,464,772 | Paine | Aug. 14, 1923 |
| 2,605,736 | Cook et al. | Aug. 5, 1952 |